(12) United States Patent
Maimone

(10) Patent No.: US 11,022,799 B2
(45) Date of Patent: Jun. 1, 2021

(54) PROJECTOR-COMBINER DISPLAY WITH BEAM REPLICATION

(71) Applicant: Facebook Technologies, LLC, Menlo Park, CA (US)

(72) Inventor: Andrew Maimone, Duvall, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 183 days.

(21) Appl. No.: 16/111,171

(22) Filed: Aug. 23, 2018

(65) Prior Publication Data

US 2020/0064633 A1    Feb. 27, 2020

(51) Int. Cl.

| | |
|---|---|
| *G02B 27/01* | (2006.01) |
| *G02B 27/10* | (2006.01) |
| *G02B 27/28* | (2006.01) |
| *G02B 5/30* | (2006.01) |
| *G06F 3/01* | (2006.01) |
| *G02B 6/28* | (2006.01) |
| *G02B 6/293* | (2006.01) |

(52) U.S. Cl.
CPC ....... *G02B 27/0172* (2013.01); *G02B 5/3083* (2013.01); *G02B 6/2817* (2013.01); *G02B 6/29316* (2013.01); *G02B 27/106* (2013.01); *G02B 27/283* (2013.01); *G06F 3/013* (2013.01); *G02B 2027/0174* (2013.01); *G02B 2027/0178* (2013.01)

(58) Field of Classification Search
CPC ............ G02B 27/0172; G02B 27/0101; G02B 27/0103; G02B 5/3083; G02B 6/2817; G02B 6/29316; G02B 27/106; G02B 27/283; G02B 2027/0174; G02B 2027/0107; G02B 2027/011; G02B 2027/0112; G02B 2027/0178; G02B 27/0081; G06F 3/013
USPC .......... 359/630, 629, 631, 633, 634, 637, 13
See application file for complete search history.

(56) References Cited

U.S. PATENT DOCUMENTS

| | | |
|---|---|---|
| 2012/0002256 A1 | 1/2012 | Lacoste et al. |
| 2015/0016777 A1 | 1/2015 | Abovitz et al. |
| 2016/0252742 A1 | 9/2016 | Wakabayashi |
| 2016/0274356 A1 | 9/2016 | Mason |
| 2017/0031161 A1 | 2/2017 | Rossini |

(Continued)

FOREIGN PATENT DOCUMENTS

| | | |
|---|---|---|
| WO | 03/081320 A1 | 10/2003 |
| WO | 2010-119240 | 10/2010 |

(Continued)

OTHER PUBLICATIONS

PCT/US2018/048202 PCT Search Report dated Oct. 25, 2019.

*Primary Examiner* — Marin Pichler
(74) *Attorney, Agent, or Firm* — Pequignot + Myers; Matthew A. Pequignot

(57) ABSTRACT

A near-eye display (NED) includes an image replicator and an image combiner. The image replicator is configured for receiving a beam of image light from a source such as an image projector, and splitting the beam into a plurality of second beams of image light. The combiner is configured to relay the plurality of second beams to an eyebox of the NED such that the second beams at the eyebox are laterally offset from one another. The etendue of the NED may be increased by replicating and relaying the image beams.

19 Claims, 13 Drawing Sheets

(56) References Cited

U.S. PATENT DOCUMENTS

| | | |
|---|---|---|
| 2017/0045673 A1 | 2/2017 | Lee et al. |
| 2017/0131546 A1 | 5/2017 | Woltman et al. |
| 2017/0255013 A1* | 9/2017 | Tam .................... H04B 10/516 |
| 2017/0315360 A1 | 11/2017 | Takeda |
| 2018/0067325 A1 | 3/2018 | Yonekubo et al. |
| 2018/0149873 A1 | 5/2018 | Edwin et al. |

FOREIGN PATENT DOCUMENTS

| | | |
|---|---|---|
| WO | 2014-009717 | 1/2014 |
| WO | 17/120320 A1 | 7/2017 |

* cited by examiner

PROJECTOR-COMBINER DISPLAY WITH BEAM REPLICATION

TECHNICAL FIELD

The present disclosure relates to visual displays and display systems, and in particular to wearable displays.

BACKGROUND

Head mounted displays (HMDs) are used to provide virtual imagery to a user, or to augment real scenery with additional information or virtual objects. The virtual or augmented imagery can be three-dimensional (3D) to enhance the experience and to match virtual objects to the real 3D scenery observed by the user. In some HMD systems, a head and/or eye position and orientation of the user are tracked, and the displayed scenery is dynamically adjusted depending on the user's head orientation and gaze direction, to provide experience of immersion into a simulated or augmented 3D scenery.

One problem of head-mounted displays, and near-eye displays (NEDs) in particular, is a limited etendue of an optical system. The etendue can be defined as a product of an area of the display's eyebox, i.e. the exit pupil of the display, and the display's field of view solid angle. Existing displays, particularly those with compact form factors, having large fields of view tend to have small eyeboxes, and vice versa. Large fields of view is desirable for a greater degree of immersion into the virtual or augmented reality, while large eyeboxes provide the user with freedom and convenience of placing the display in front of the eyes and eye rotation. Larger eyeboxes provide a greater degree of accommodation of different users having individual size and shape of the head, and different distances between the eyes.

Although the size of the eyebox may depend on magnification of the optical imaging system, the etendue is invariant of the magnification. Because of the etendue invariance, providing larger eyebox results in a narrower field of view, and widening the field of view results in a smaller eyebox.

BRIEF DESCRIPTION OF THE DRAWINGS

Exemplary embodiments will now be described in conjunction with the drawings, in which.

DETAILED DESCRIPTION

Figure 1:
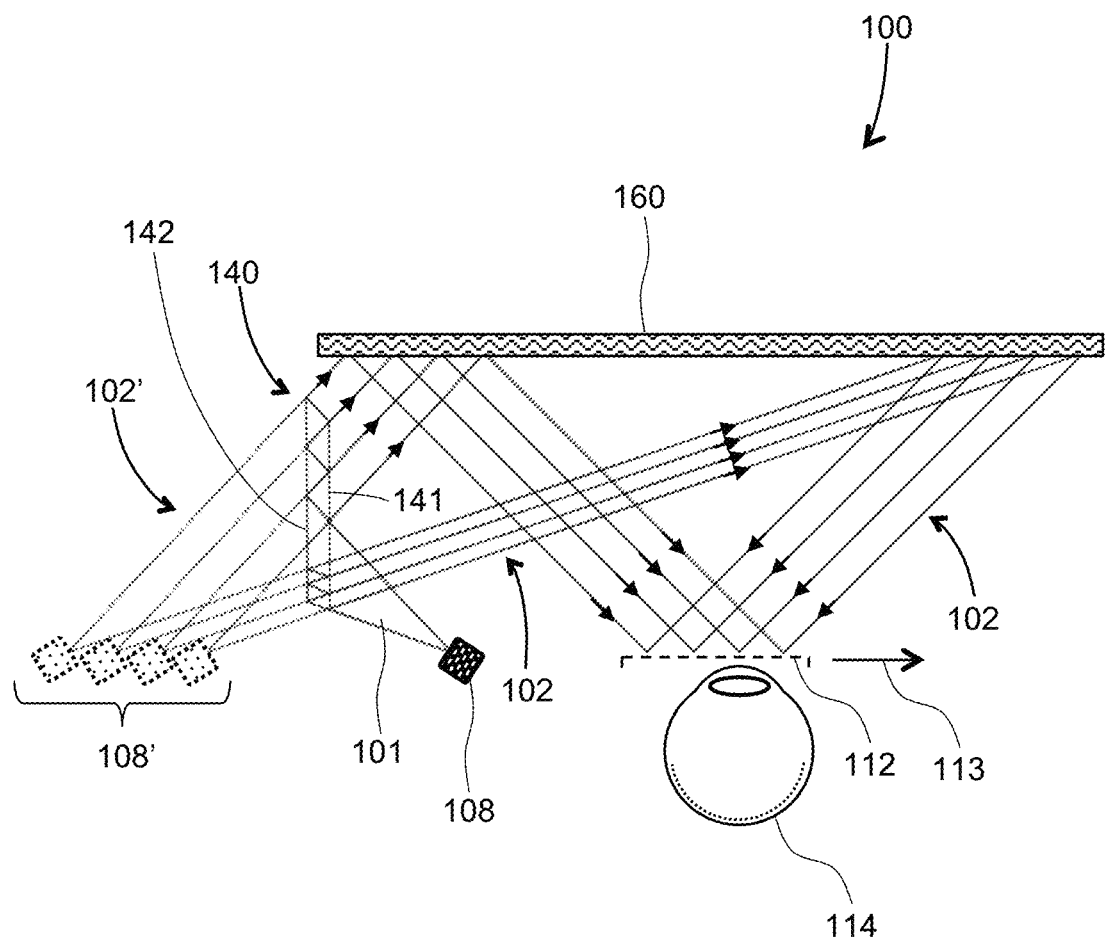
FIG. 1 is a schematic side view of a near-eye display (NED) example of the present disclosure including a waveguide-based image replicator.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In accordance with the present disclosure, the etendue of a near-eye display may be increased by replicating a beam of image light, and disposing a combiner element to redirect the replicated beams of image light to the eyebox in a grid-like pattern, such that at any position of the user's eye, at least one beam of image light impinges onto the eye's pupil, thereby expanding the eyebox of the display while preserving the field of view.

In accordance with the present disclosure, there is provided a near-eye display (NED) comprising an image replicator and an image combiner. The image replicator may be configured for receiving a first beam of image light and splitting the first beam into a plurality of second beams of image light propagating parallel to each other. The combiner may be configured for receiving the plurality of second beams and relaying the plurality of second beams to an eyebox of the NED. The combiner may be further configured to selectively redirect rays of the second beams depending on angle of incidence of the rays of the second beams on the combiner, such that rays of the second beams split from a corresponding ray of the first beam and redirected by the combiner are parallel to each other and laterally offset in a first direction at the eyebox.

In some embodiments, the first beam is diverging and comprises an image in angular domain, the second beams split by the image replicator are diverging, and the second beams relayed by the combiner to the eyebox are converging, parallel to each other, and comprise the image in angular domain. The combiner may be made angular- and wavelength-selective for relaying the plurality of second beams to the eyebox while transmitting external light to the eyebox substantially without modification. The NED may further include an image projector for providing the first diverging beam comprising the image in angular domain.

In some embodiments, the image replicator may include a first waveguide comprising first and second surfaces. The first surface may be partially reflective at a wavelength of the image light to split off second beams of the plurality of second beams at reflections from the first surface as the first beam propagates in the first waveguide between the first and second surfaces in a zigzag pattern. The first waveguide may include a coating at the first surface, e.g. a metallic coating or a dielectric coating. The second surface may be fully reflective at the wavelength(s) of the image light. The reflectivity of the first surface of the first waveguide may be spatially variant.

The first waveguide may contain a diffractive structure for in-coupling the first beam into the first waveguide, an out-coupling second beams of the plurality of second beams from the waveguide, or both. The diffractive structure may have a spatially varying diffraction efficiency for equating optical power of the second beams. A grating axis of the diffractive structure may be disposed at an acute angle to a plane of incidence of the first beam onto the diffractive structure, such that in operation, the second beams form a two-dimensional (2D) grid of beams at the eyebox.

In some embodiments, the first waveguide includes an internally embedded quarter-wave waveplate, and the first surface of the first waveguide includes a polarization-selective reflector. The polarization-selective reflector may be configured to transmit the first beam having a first polarization. The first waveguide may further include a side surface for receiving the first beam of image light, wherein the side surface is at a non-orthogonal angle to the first and second surfaces. In some embodiments, the first waveguide includes a first optical element comprising the first surface, and a second, distinct optical element comprising the second surface, such that in operation, the first beam propagates in an air gap between the first and second optical elements.

The image light may include a plurality of color channels. The first and second surfaces of the waveguide may be at least partially transmissive at wavelengths of visible light different from wavelengths of the plurality of color channels. The image replicator may include a second waveguide comprising third and fourth surfaces at an angle to the first and second surfaces of the first waveguide, for receiving each second beam from the first waveguide and splitting each second beam into a plurality of third beams of image light. The combiner may be configured for relaying each third beam at the eyebox of the NED such that the third beams at the eyebox are laterally offset in a second direction.

In some embodiments, the image replicator may include a first stack of reflectors in an optical path of the first beam. Each reflector of the first stack of reflectors may be configured for splitting a second beam of the plurality of second beams from the first beam. The image replicator may further include a second stack of reflectors disposed at an angle to the first stack of reflectors for receiving each second beam from the first stack of reflectors and splitting each second beam into a plurality of third beams of image light. The combiner may be configured for relaying each third beam at the eyebox of the NED, such that the third beams at the eyebox are laterally offset in a second direction. The first stack of reflectors may include at least one variable reflector.

An eye tracking system and a controller coupled to the eye tracking system may be provided in an NED of the present disclosure. The eye tracking system may determine at least one of position or orientation of a user's eye at the eyebox. The controller may be operably coupled to the at least one variable reflector and configured to vary reflectivity of the at least one variable reflector depending on the at least one of position or orientation of the user's eye determined by the eye tracking system.

The combiner may include an angularly multiplexed volume hologram comprising a succession of overlapping phase profiles for focusing the second beams at the eyebox. The succession of overlapping phase profiles may have a step corresponding to a lateral offset of the second beams at the eyebox, and each phase profile may be configured to selectively redirect rays of the second beams depending on angle of incidence of the rays of the second beams on the combiner. For example, an ellipsoidal phase profile may be provided. The combiner may also include a metasurface.

For embodiments where the NED includes an image projector for providing the first beam comprising an image in angular domain, the image projector may have an exit pupil smaller than the step; and/or an acceptance angle of a first phase profile of the succession of overlapping phase profiles may be no greater than an exit pupil size of the image projector divided by an optical distance between the volume hologram and the image projector. A holographic projector may be provided for generating the first beam of image light. The holographic projector may be configured to lessen optical aberrations of the combiner. The holographic projector may possess a variable focus.

In accordance with another aspect of the present disclosure, there is further provided a method for displaying an image by an NED. The method may include receiving a first beam of image light and splitting the first beam into a plurality of second beams of image light propagating parallel to each other, and receiving the plurality of second beams and relaying the plurality of second beams at an eyebox of the NED by selectively redirecting rays of the second beams depending on angles of the rays of the second beams, such that rays of the second beams split from a corresponding ray of the first beam are parallel to each other and offset in a first direction. In some embodiments, the first beam is diverging and comprises an image in angular domain, the second beams split by the image replicator are diverging, and the second beams relayed by the combiner at the eyebox are converging, parallel to each other, and comprise the image in angular domain.

Referring now to FIG. 1, a near-eye display (NED) 100 of the present disclosure includes an image replicator 140 and a combiner 160. The image replicator 140 may include a waveguide having a translucent reflective surface 141 and blind, i.e. 100% reflective, surface 142, which may be disposed parallel to the translucent reflective surface 141. The image replicator 140 receives a diverging first beam 101 of image light, which can be provided by a projector 108. The diverging first beam 101 of image light may include an image in angular domain, where different angles of the rays in the diverging first beam 101 correspond to different coordinates of a pixel in the image to be displayed.

The first beam 101 propagates in the waveguide of the image replicator 140 in a zigzag pattern, i.e. upwards in FIG. 1. The image replicator 140 splits the first beam 101 into a plurality of second beams 102 of image light, producing a plurality of virtual projectors 108' emitting virtual second beams 102' of image light carrying a copy of the image in angular domain. The virtual second beams 102' may be parallel to each other as shown. Herein, the term "parallel", when applied to diverging or converging beams, means each pair of corresponding rays of the beams are parallel.

The second beams 102 propagate towards the combiner 160. The combiner 160 may include a plurality of recorded holograms configured to receive the plurality of second beams 102, to redirect the plurality of second beams 102 toward an eyebox 112 of the NED 100, and to focus the images of projectors 108'. The second beams 102 at the eyebox 112 are converging and laterally offset in a first direction 113. In other words, the combiner 160 is configured to selectively redirect rays of the second beams 102 depending on angle of incidence of the rays of the second beams 102 on the combiner 160, such that rays of the second beams 102 split from a corresponding ray of the first beam 101 and redirected by the combiner 160 are parallel to each other and laterally offset in a first direction at the eyebox 112. A user's eye 114 can be placed anywhere at the eyebox 112, while being able to receive at least one of the second beams 102 of image light to observe the image. Providing multiple second beams 102 increases the size of the eyebox 112 in the first direction 113. The beams 102 can be made parallel to one another, such that the image observed by the eye 114, does not undergo a shift when the eye 114 shifts from one second beam 102 to another. The eyebox 112 is an area where the observed image can be completely seen and has a required image quality. Different types of image replicators, combiners, and projectors with different degree of divergence of the image light may be used in the NED 100. These will be described further below.

Figure 2A:
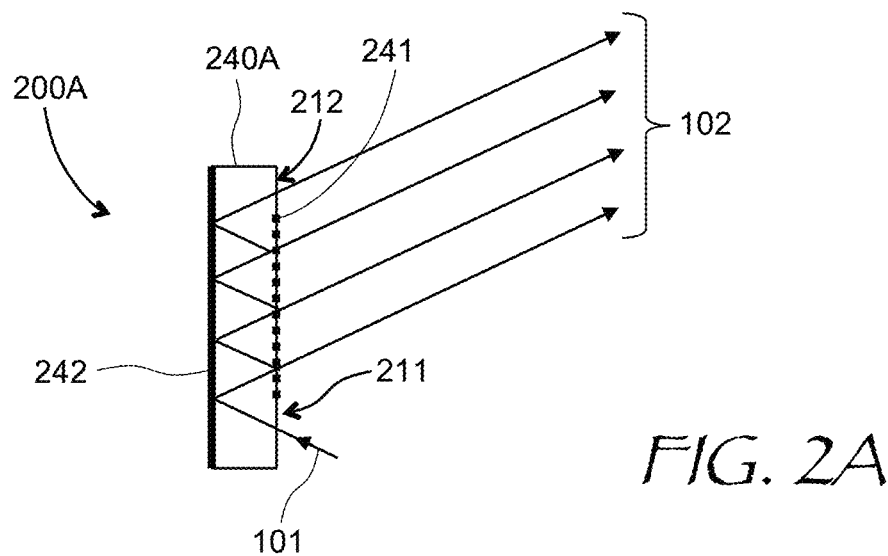
FIG. 2A is a schematic side view of a waveguide-based one-dimensional (1D) image replicator, the waveguide having opposed blind and translucent mirror surfaces.

Non-limiting examples of the image replicator 140 will now be considered. Referring to FIG. 2A, a waveguide image replicator 200A includes a planar waveguide, e.g. a glass plate 240A having first 241 and second 242 parallel surfaces. At least a portion of the first surface 241 can be made partially reflective at wavelength(s) of the image light, e.g. by depositing a corresponding translucent metal or dielectric reflector coating at the first surface 241. The first beam 101 impinges onto the glass plate 240A at an input end 211 of the first surface 241. In one embodiment, the input end 211 is antireflection (AR) coated to lessen optical losses at the first entry. The input end 211 may be left uncoated or, in yet another embodiment, the translucent metal or dielectric reflector extends to include the input end 211. A partially or completely reflective coating may be deposited at the second surface 242. The coating may include a metallic and/or dielectric coating. One second beam 102 of the plurality of second beams 102 is split off the first surface 241 at each reflection from the partially reflecting portion of the first surface 241, as the first beam 101 propagates in the glass plate 240A between the first 241 and second 242 surfaces in a zigzag pattern, i.e. upwards in FIG. 2A. The last second beam 102 exits the glass plate 240A at an exit location 212, which may also be AR coated. To equalize the optical powers carried by different second beams 102, the reflectivity of the first surface 241 of the glass plate 240A can be made spatially variant. For example, the reflectivity may decrease in going upwards in FIG. 2A, such that at each subsequent reflection from the first surface 241, a larger portion of the remaining optical power of the second beam 102 is reflected, making the second beams 102 have nearly equal, or at least less different, optical power. In embodiments where the image light comprises a plurality of color channels, e.g. red (R) color channel, green (G) color channel, and blue (B) color channel, the first 241 and second 242 surfaces of the glass plate 240A can be made at least partially transmissive at wavelengths of visible light other than wavelengths of the plurality of the color channels, to make the waveguide at least partially transparent at the other wavelengths. Narrowband, e.g. laser-line, color channels can reduce a residual coloring when looking through the glass plate 240A. This may be convenient in applications where the waveguide is placed in a way of peripheral vision of a user wearing the near-eye display.

Figure 2B:
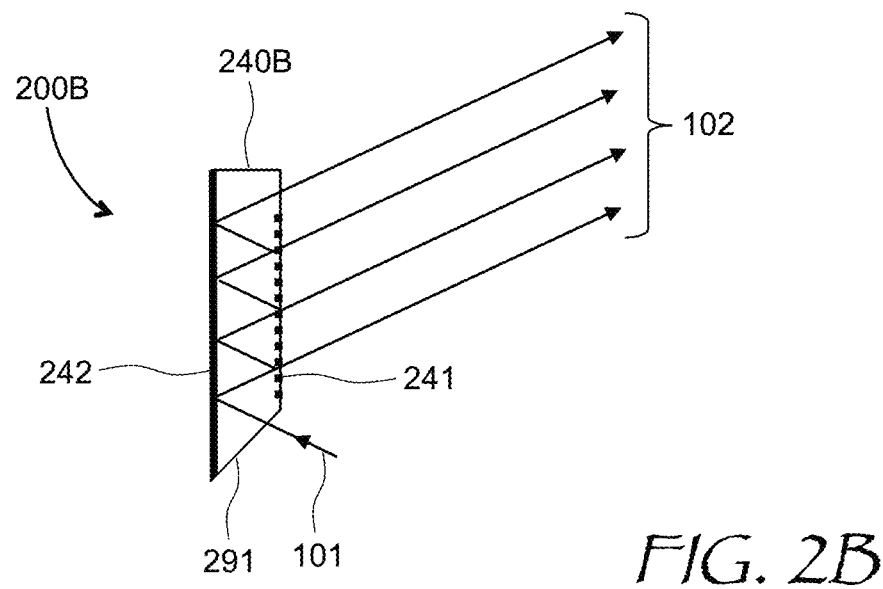
FIG. 2B is a schematic side view of a waveguide-based image replicator having a side surface for receiving a beam of image light.

A waveguide image replicator 200B of FIG. 2B is similar to the waveguide image replicator 200A of FIG. 2A. The waveguide image replicator 200B of FIG. 2B includes a glass plate 240B having a side surface 291 for receiving the first beam 101 of image light. The side surface 291 can be slanted, i.e. disposed at a non-orthogonal angle to the first 241 and second 242 surfaces of the glass plate 240B. The side surface 291 may be AR coated, and/or disposed at a Brewster angle to reduce reflection of the first beam 101 when the first beam 101 is linearly polarized in a plane of incidence onto the side surface 291, i.e. in the plane of FIG. 2B. The first beam 101 needs to be launched at such an angle that an incidence angle of the first beam 101 onto the first surface 241 is less than a TIR angle, such that the second beams 102 can exit the glass plate 240A.

Figure 2C:
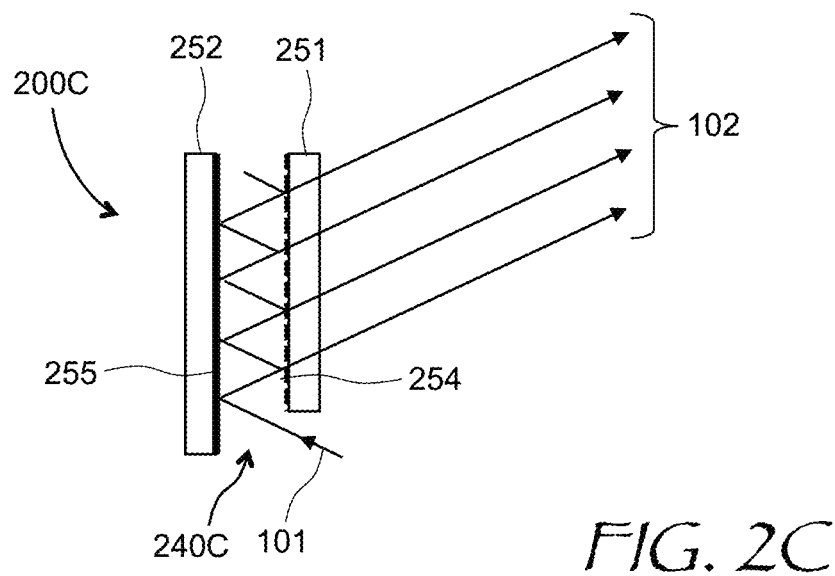
FIG. 2C is a schematic side view of an image replicator including a waveguide formed by an air gap between two reflectors.

Referring to FIG. 2C, a waveguide image replicator 200C is similar to the waveguide image replicator 200A of FIG. 2A. The waveguide image replicator 200C of FIG. 2C includes a first optical element 251 comprising a first, partially reflective surface 254 and a second, distinct optical element 252 comprising a second surface 255 which may be partially or fully reflective. In operation, the first beam 101 of image light is coupled to an air gap 240C between the first 251 and second 252 optical elements. Thus, the air gap 240C operates as a waveguide for the first beam 101. The air gap 240C waveguide reduces the travel distance of the first beam 101 in glass, which may avoid wavefront distortion of the first beam 101 due to non-uniformities of refractive index, inclusions, micro-bubbles, etc. in optical materials used.

Figure 2D:
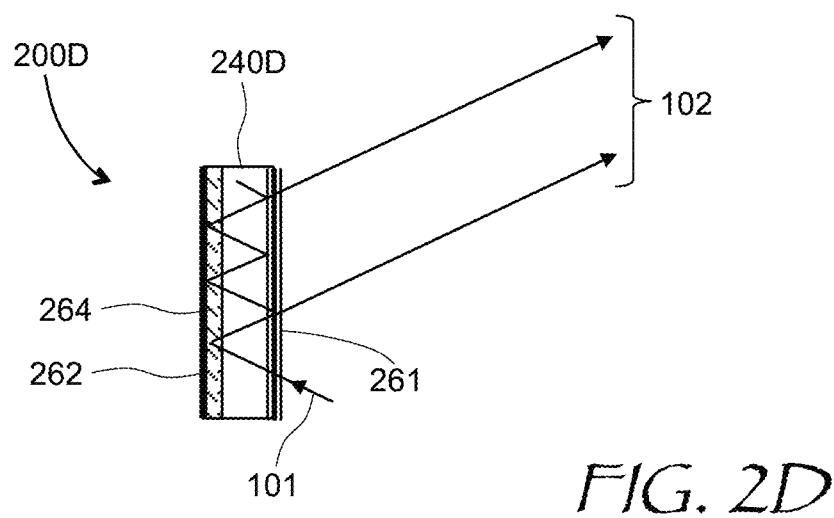
FIG. 2D is a schematic side view of a waveguide-based image replicator including a polarization-selective mirror and a waveplate.

Referring now to FIG. 2D, a waveguide image replicator 200D is similar to the waveguide image replicator 200A of FIG. 2A. The waveguide image replicator 200D of FIG. 2D includes a waveguide e.g. a glass plate 240D, a polarization-selective reflector 261 supported by the glass plate 240D, and a stack of a full reflector 262 and a quarter-wave waveplate 264, supported by the glass plate 240D on the opposite side of the glass plate 240D. The polarization-selective reflector 261 can be configured to transmit light at a first polarization, and partially reflect light at a second polarization orthogonal to the first polarization. The first and second polarizations may include horizontal and vertical linear polarizations, left- and right-circular polarizations, etc. In operation, the first beam 101 at the first polarization impinges onto the glass plate 240D. Then, the first beam 101 propagates through the quarter-wave waveplate 264, impinges on the 100 reflector 262, and propagates back through the quarter-wave waveplate 264. Double-pass propagation through the quarter-wave waveplate 264 is equivalent to propagation through a half-wave waveplate, which changes the polarization of the first beam 101 from the first polarization to the second polarization. This causes the first beam 101 to be partially reflected by the polarization-selective reflector 261, and the reflections repeat in a zigzag pattern. The quarter-wave waveplate may be disposed on the opposite side of the glass plate 240D. In FIG. 2D, only two generated second beams 102 are shown, for brevity. The polarization configuration of FIG. 2D may also be used in the waveguide image replicator 200D of FIG. 2D, by replacing the partially reflective surface 254 with the polarization-selective reflector 261 and by placing a quarter-wave waveplate 264 inside the air gap 240C, e.g. at the second surface 255.

Figure 2E:
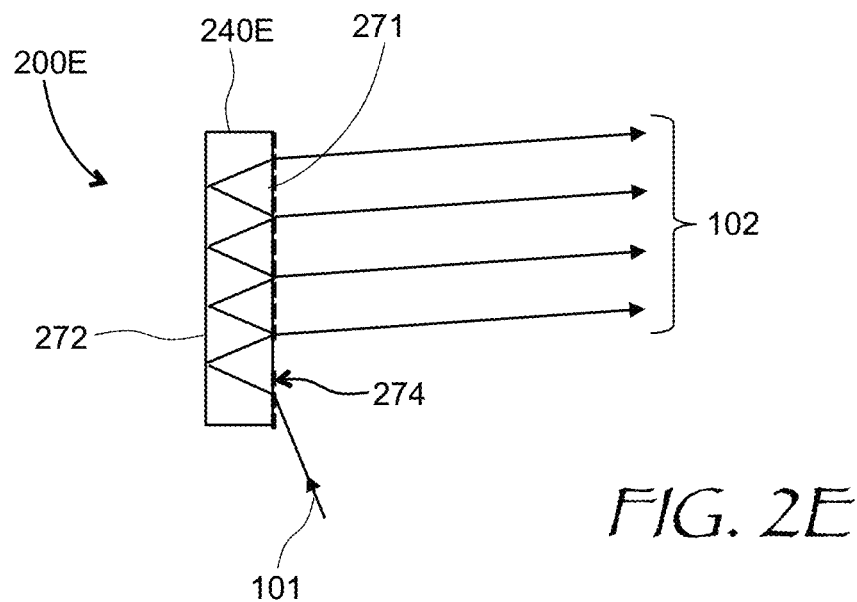
FIG. 2E is a schematic side view of a waveguide-based image replicator including in-coupling and out-coupling diffraction gratings.

Turning to FIG. 2E, a waveguide image replicator 200E is similar to the waveguide image replicator 200A of FIG. 2A. The waveguide image replicator 200E of FIG. 2E includes a waveguide e.g. a glass plate 240E, an out-coupling diffraction grating 271 on one side of the glass plate 240E, and an in-coupling diffraction grating 274. The in-coupling grating 274 is configured to change the ray angles of the beam 101 so that light propagates through waveguide 240E through total internal reflection from a rear surface 272. The out-coupling grating 271 is designed to change the ray angles of the beam 101 so that light no longer propagates through total internal reflection (TIR) and exits the waveguide. The out-coupling 271 grating may have low diffraction efficiency to allow formation of multiple beams 102. In operation, the first beam 101 is diffracted by the in-coupling diffraction grating 274 to propagate in the glass plate 240E in a zigzag pattern, with a second beam 102 of the plurality of second beams 102 being diffracted out along the zigzag pattern, as shown. The diffraction efficiency of diffraction grating 271 may be varied spatially to improve the uniformity of the second beams 102. The diffraction grating 271 may include any diffractive, holographic, polarization-based or resonant structures, e.g. surface relief gratings, volume holograms, metasurfaces, Pancharatnam-Berry phase (PBP) elements, or polarization volume holograms. The grating structures may have a spatially varying diffraction efficiency for equating optical power of the second beams 102. A two-dimensional (2D) pupil replication may be obtained by orienting an axis of the diffraction grating 271 at an acute angle to the plane of incidence of the first beam 101 onto the in-coupling diffraction grating 274. At such orientation, the light reflected back to propagate in the glass plate 240E and light diffracted back to propagate in the glass plate 240E will propagate in non-parallel planes, effectively producing a 2D grid of the multiple beams 102.

Figure 2F:
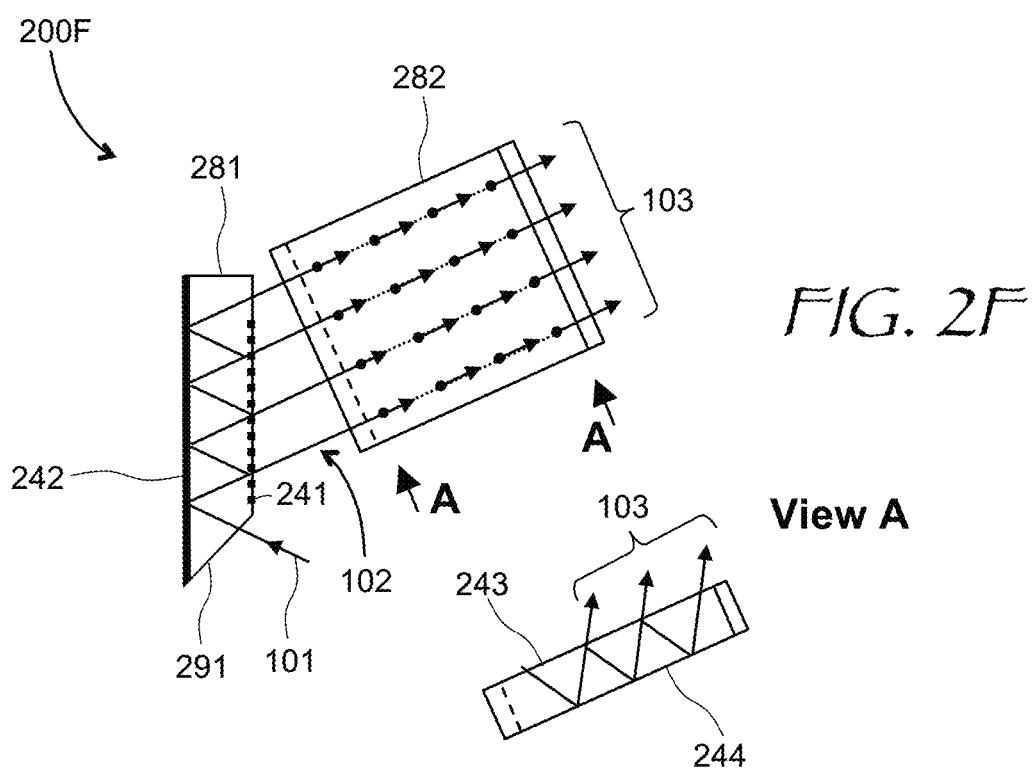
FIG. 2F is a schematic side view of a waveguide-based two-dimensional (2D) image replicator including a pair of waveguides disposed at an angle to each other.

Referring now to FIG. 2F, a 2D waveguide image replicator 200F includes not one but two waveguides. In this example, a first waveguide 281 is similar to the waveguide image replicator 200B of FIG. 2B. A second waveguide 282 is disposed at an angle to the first waveguide 281, as shown. The second waveguide 282 has third 243 and fourth 244 surfaces at an angle to the first 241 and second 242 surfaces of the first waveguide 281. In operation, each second beam 102 is received from the first waveguide 281 at the third surface 243 of the second waveguide 282 (see "View A" in FIG. 2F), and is split into a plurality of third beams 103 of image light. The third beams 103 form a 2D array of beams of image light. The combiner, e.g. the combiner 160 of FIG. 1, can be configured to relay and refocus each third beam 103 at the eyebox 112 of the NED such that the third beams 103 at the eyebox 112 are laterally offset in a second direction, i.e. perpendicular to the first direction 113 (horizontal direction in FIG. 1) and parallel to each other. The third beams 103 are disposed at the eyebox 112 in a 2D grid of beams.

Figure 2G:
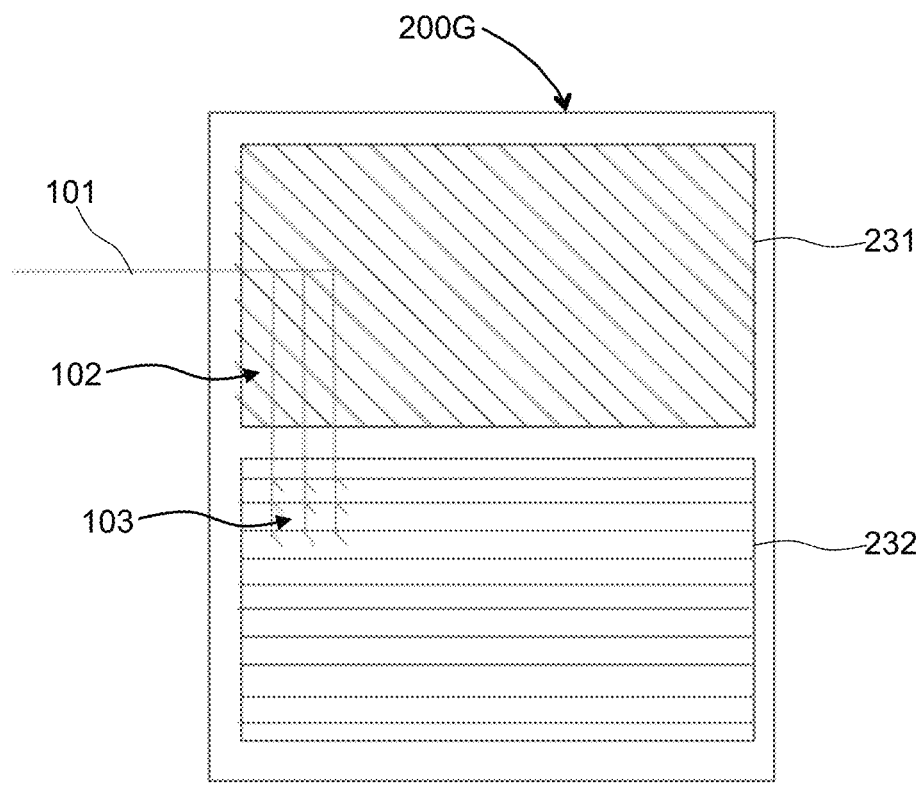
FIG. 2G is a schematic plan view of a waveguide-based two-dimensional (2D) image replicator including a pair of beam-expanding diffraction gratings.

Turning to FIG. 2G, a diffraction grating image replicator 200G includes not one but two beam-expanding diffraction gratings. A first beam-expanding diffraction grating 231 spreads the first beam 101 in a horizontal direction, providing a plurality of the second beams 102. A second beam-expanding diffraction grating 232 further spreads the plurality of second beams 102 in vertical direction, i.e. orthogonal to the horizontal direction, providing the plurality of third beams 103, which form a 2D array of beams of image light.

Figure 3:
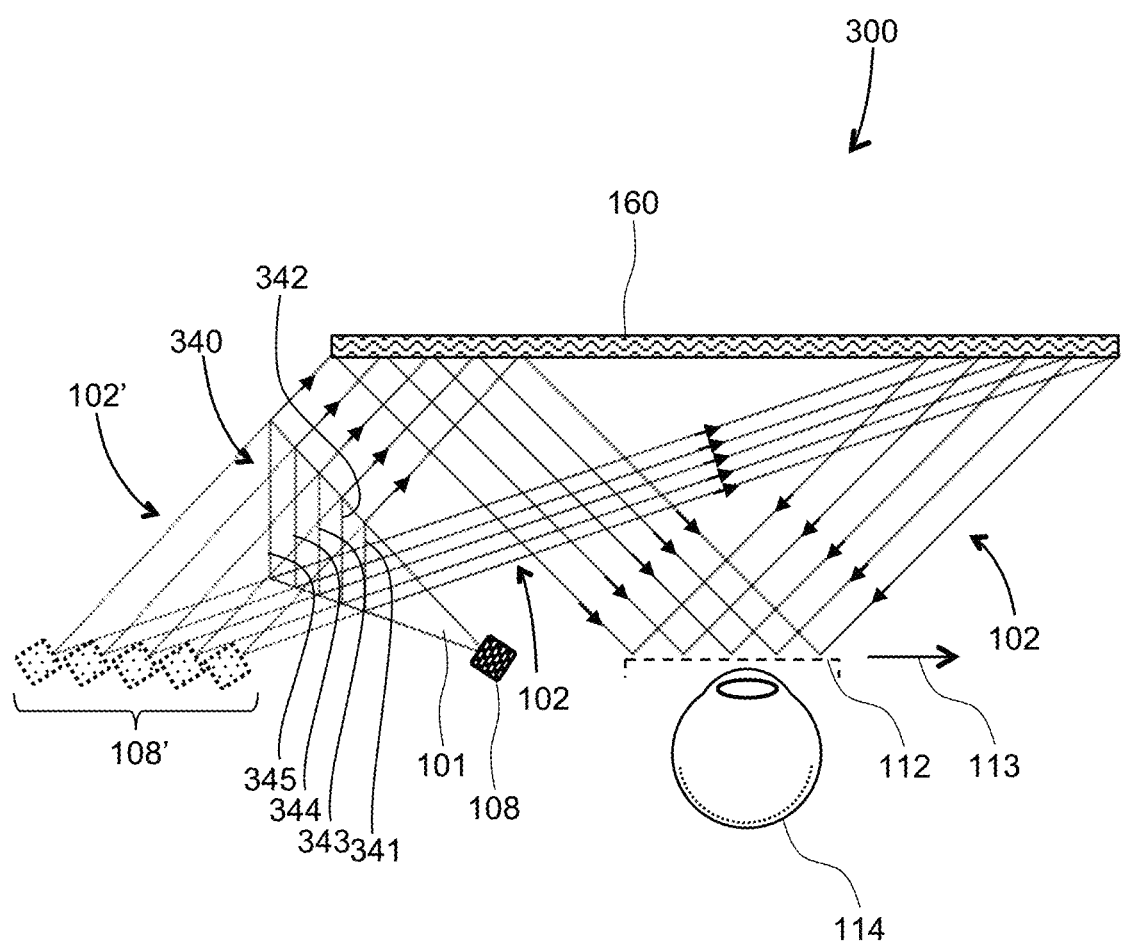
FIG. 3 is a schematic side view of an NED example of the present disclosure including a mirror stack-based image replicator.

Referring now to FIG. 3, an NED 300 is similar to the NED 100 of FIG. 1. An image replicator 340 of the NED 300 of FIG. 3 includes a stack of reflectors (e.g. five reflectors) 341, 342, 343, 344, and 345 disposed in an optical path of the first beam 101. Four first reflectors 341, 342, 343, and 344 in the image replicator 340 are configured for splitting a second beam 102 of the plurality of second beams 102 from the first beam 101, while the fifth reflector 345 may be a blind mirror reflecting the remaining optical power. The reflectors may be equally spaced apart. Such a configuration can provide the plurality of virtual projectors 108' emitting virtual second beams 102' of image light carrying the image in angular domain. The virtual second beams 102' can be parallel to each other.

The second beams 102 propagate towards the combiner 160, which receives the plurality of second beams 102 and refocuses the plurality of second beams 102 at the eyebox 112 of the NED 300. The second beams 102 at the eyebox 112 are converging, laterally offset in the first direction 113, and parallel to one another. The user's eye 114 can receive at least one of the second beams 102 of image light to observe the image. Providing multiple second beams 102 increases the size of the eyebox 112.

Figure 4A:
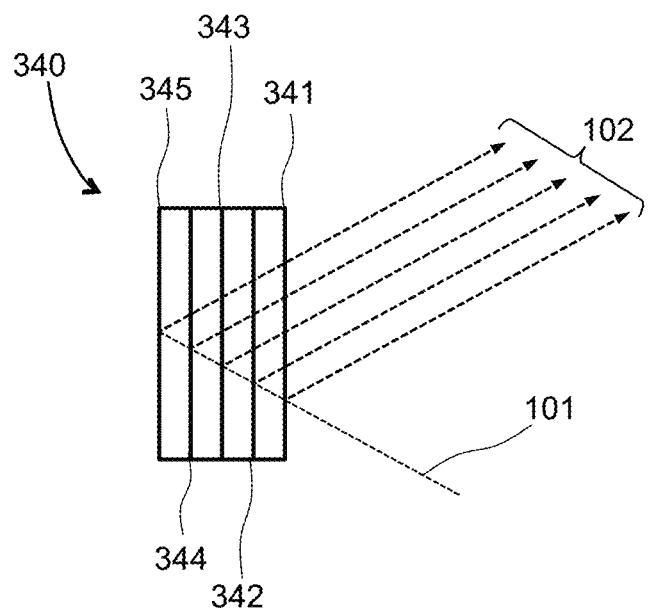
FIGS. 4A and 4B are side and top views, respectively, of a 1D image replicator including a stack of mirrors.
Figure 4B:
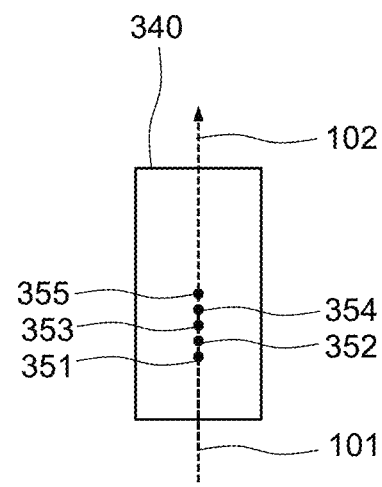

The image replicator 340 is shown in more detail in FIGS. 4A and 4B. FIG. 4A shows the image replicator 340 in side view, which illustrates how the second beams 102 are split off the first beam 101. FIG. 4B is a top view showing corresponding points of reflection 351, 352, 353, 354, and 355. The reflectivities of the individual reflectors 341, 342, 343, 344, and 345 may be identical or different. For example, the reflectivity of each subsequent reflector 341, 342, 343, 344, and 345 may increase, such that at each subsequent reflection, a larger portion of the remaining optical power of the second beam 102 is reflected, making the second beams 102 have nearly equal, or at least less different, optical power. The reflectors 341, 342, 343, 344, and 345 are parallel to each other. In some embodiments, the reflectors 341, 342, 343, 344, and 345 may also be disposed at an angle to one another. It is to be understood that the actual number of the second beams 102 may be much higher than shown in FIG. 4A, due to multiple reflections within the stack of reflectors 341, 342, 343, 344, and 345.

Figure 4C:
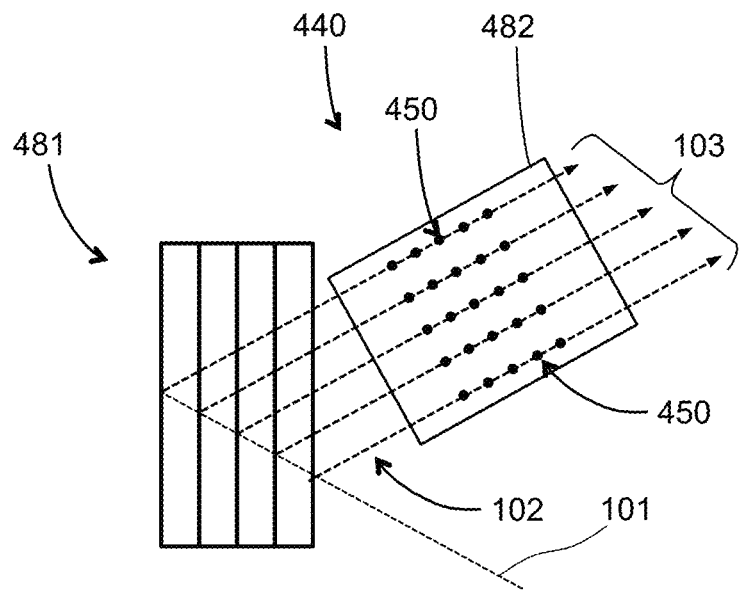
FIG. 4C is a schematic side view of a 2D image replicator including two stacks of mirrors disposed at an angle to each other.

Turning to FIG. 4C, a 2D image replicator 440 includes a first stack 481 of reflectors, which is basically the image replicator 340 of FIGS. 4A and 4B, and further includes a second stack 482 of reflectors disposed at an angle to the first stack 481 of reflectors. The second stack 482 is disposed for receiving the second beams 102 from the first stack 481 of reflectors as shown in FIG. 4C, and splitting each second beam 102 into the plurality of third beams 103 of image light. The points of splitting are shown as dots 450. In this embodiment, the combiner 160 of FIG. 1 can be configured to relay each third beam 103 at the eyebox 112 of the NED such that the third beams 103 at the eyebox 112 are laterally offset in a second direction, i.e. perpendicular to the first direction 113 (horizontal direction in FIG. 1) and parallel to each other. The third beams 103 are disposed at the eyebox 112 in a 2D grid of beams.

Figure 5:
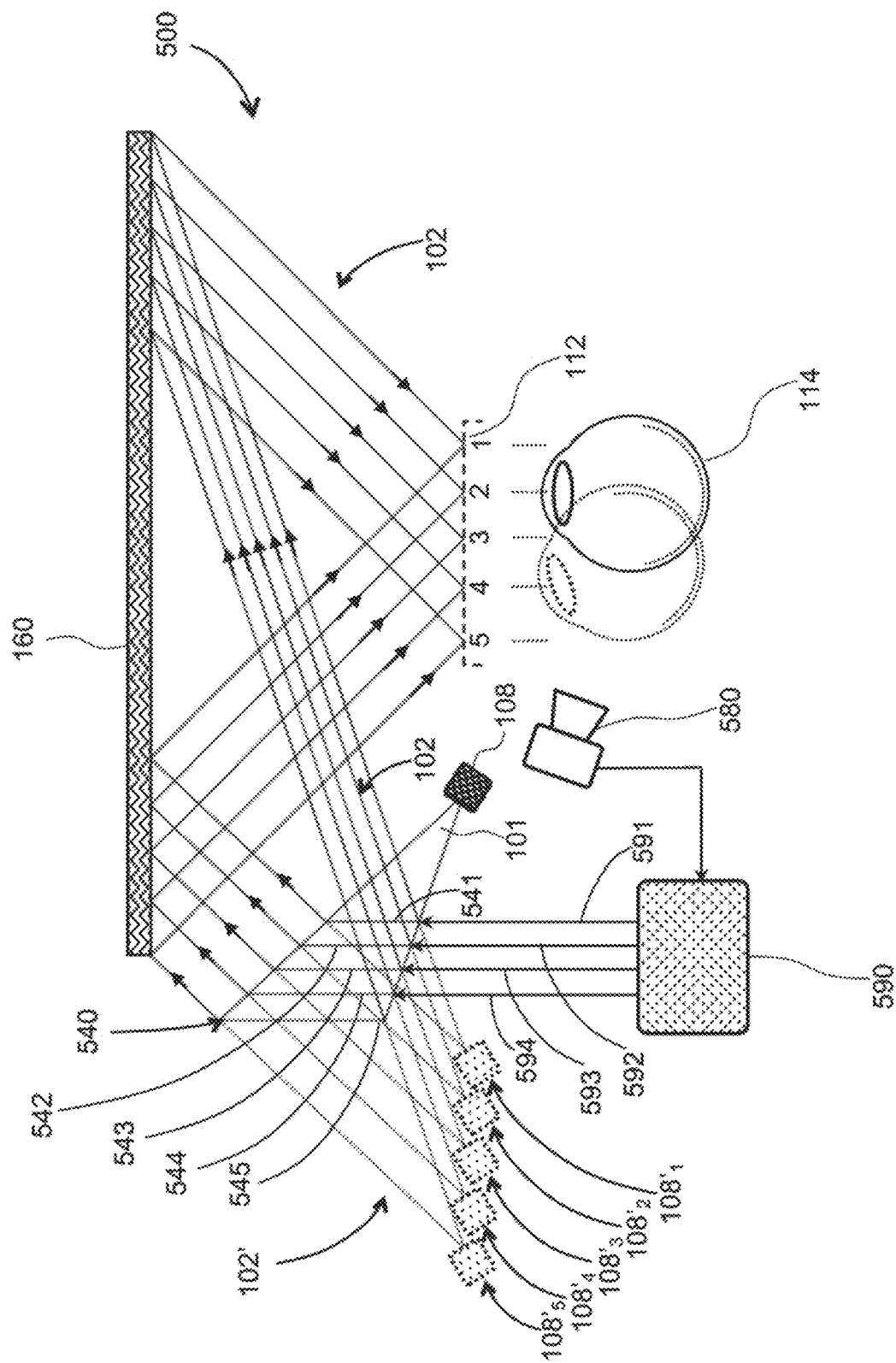
FIG. 5 is a schematic side view of a near-eye display equipped with an eye-tracking system.

Referring now to FIG. 5, an NED 500 is similar to the NED 300 of FIG. 3 in that it also includes a mirror stack-based image replicator 540. The image replicator 540 includes a stack of first to fourth variable reflectors 541, 542, 543, and 544, as well as a fifth mirror 545, which can be a fully reflective mirror. Herein, the term "variable reflector" means that the reflector's coefficient of reflectivity can be varied in a controllable manner, e.g. by applying an external control signal. At least one variable reflector may be provided in the reflector stack of the image replicator 540. The NED 500 further includes an eye tracking system 580 for determining at least one of position or orientation of the user's eye 114 in the eyebox 112.

A controller 590 is operably coupled to the eye tracking system 580 and the variable reflectors 541, 542, 543, and 544 of the image replicator 540 via respective control lines 591, 592, 593, and 594. The controller 590 can be configured to vary reflectivity of the variable reflectors 541, 542, 543, and 544 of the image replicator 540 depending on the at least one of position or orientation of the user's eye 114 determined by the eye tracking system 580. By way of example, when the eye tracking system 580 determines that the user's eye 114 is at a leftmost position denoted by "1" at the eyebox 112, the controller 590 sends a control signal via the rightmost (first) control line 591 to set the reflectivity of the first reflector 541 to a maximum reflectivity, e.g. close to 100%. This increases a brightness of the perceived image, since otherwise the light propagated to the second 542 to fifth 545 reflectors would be wasted. When the eye tracking system 580 determines that the user's eye 114 is at a second position denoted by "2" at the eyebox 112, as depicted in FIG. 5, the controller 590 can send a control signal via the second control line 592 to set the reflectivity of the second reflector 542 to maximum reflectivity, e.g. close to 100%, while setting the reflectivity of the first reflector 541 to minimum reflectivity and maximum throughput. When the user's eye 114 is at a third position "3", the third mirror 543 is set to the max reflectivity; and when the user's eye 114 is at a fourth position "4", the fourth mirror 544 is set to the max reflectivity. When the user's eye 114 is at the last (fifth) position "5", all variable mirrors 541-544 can be set to minimum reflectivity and maximum transmission. When a single mirror is at maximum reflectivity, the image formed by the second beams 102 does not need to be at infinity, since the user's eye 114 observes a single image replica at a time. When at intermediate location between neighboring positions "1" to "5", the two reflectors near those positions can be made to reflect more light. The gaze angle of the eye 114 may also be used to determine the set of optimal reflectivities of the mirrors 541-544 to maximize the overall brightness and clarity of the perceived image. The control lines 591-595 may be combined into a common control line or bus.

Figure 6:
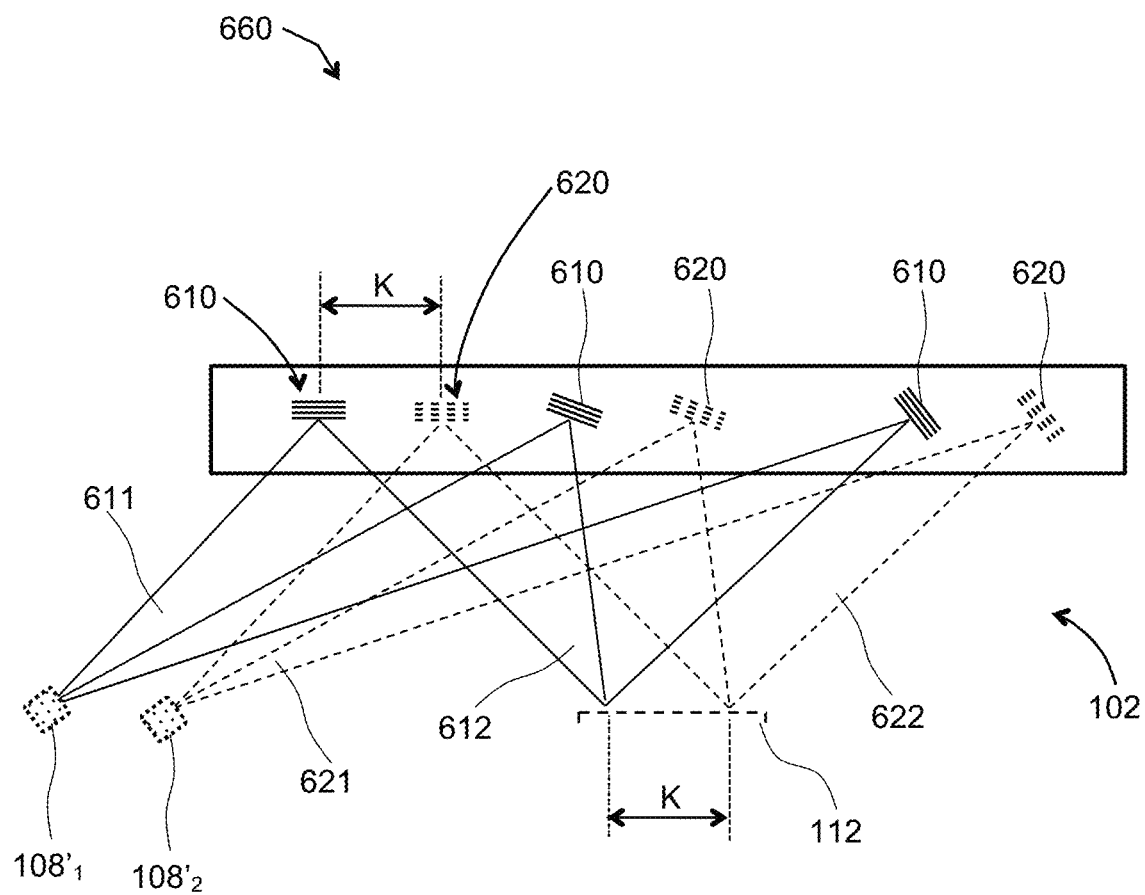
FIG. 6 is a schematic side view of a combiner for a near-eye display of the present disclosure including a multiplexed volume hologram.

Turning to FIG. 6, a holographic combiner 660 may be used as the combiner 160 in the NEDs 100, 300, and 500 of FIGS. 1, 3, and 5 respectively. In this example, the holographic combiner 660 is a multiplexed volume hologram including a succession of superimposed phase profiles. These phase profiles can be configured for relaying the second beams 102 toward the eyebox 112 and focusing the image. For example, the phase profiles can be ellipsoidal, i.e. they can add an optical phase similar to an elliptical reflector, for refocusing a diverging second beam 102 at one focus to a converging second beam 102 at the other focus. Two such phase profiles, a first profile 610 and a second profile 620, are illustrated schematically in FIG. 6. The first profile 610 receives a beam 611 of image light emitted by a first virtual source $108'_1$, relays beam 611 as a beam 612 at the eyebox 112, and focuses the beam 612. The second profile 620 receives a beam 621 of image light emitted by a second virtual source $108'_2$, relays beam 621 as a beam 622 at the eyebox 112, and focuses the beam 622. The first profile 610 and the beams 611 and 612 are shown in solid lines, and the second profile 620 and the corresponding beams 621 and 622 are shown with dashed lines. It is noted that only portions of the overlapping first 610 and second 620 phase profiles, reflecting the drawn rays of the beams 611 and 621, are illustrated for brevity. The volume hologram comprising the combiner is configured so that the multiplexed holograms are angular-selective and wavelength-selective to the corresponding virtual sources $108'_1$ and $108'_2$. Each phase profile 610, 620 is configured to selectively redirect rays of the corresponding second beams 611, 621 depending on angle of incidence of the rays of the second beams 611, 621 on the combiner. That is, light received by the combiner from source $108'_1$ will affected substantially by phase profile 610 only, and light received by the combiner from source $108'_2$ will be affected substantially by phase profile 620 only; relaying the beams 611 and 621 to the eyebox 112 as the beams 612 and 622, while transmitting external light to the eyebox 112 substantially without modification. The succession of overlapping phase profiles, i.e. the first 610 and second 620 profiles, may be identical profiles but with a translation of step K corresponding to a lateral offset of the second beams 612, 622 at the eyebox 112, as illustrated. The step K may be selected to lessen or minimize crosstalk between the holograms represented by the phase profiles 610 and 620. It is to be understood that although only two virtual sources $108'_1$ and $108'_2$ are shown in FIG. 6, a linear or 2D array of virtual sources including many more virtual sources may be used. Any element with angular-selective properties, e.g. a metasurface, may be used instead of the holographic combiner 660.

Figure 7A:
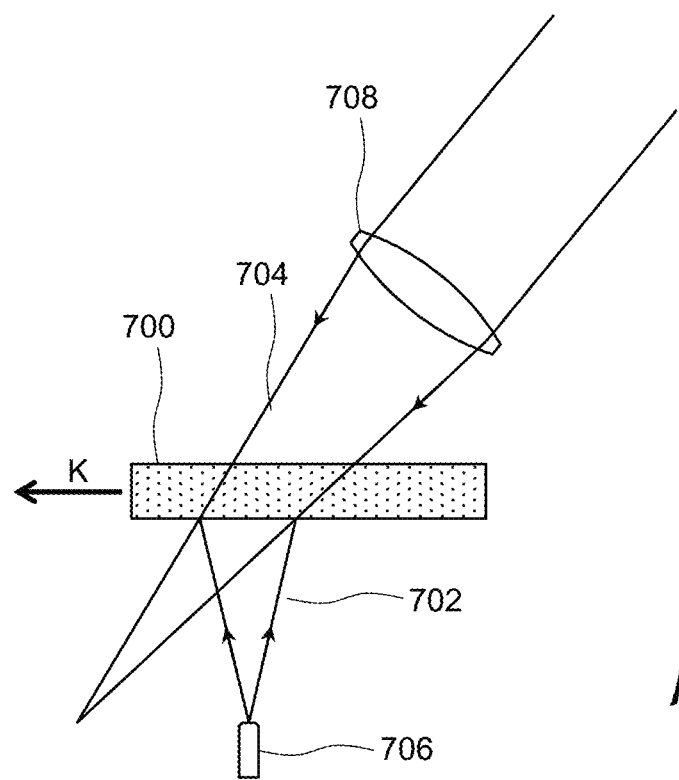
FIG. 7A is a schematic side view of an apparatus for recording the multiplexed volume hologram of FIG. 6.
Figure 7B:
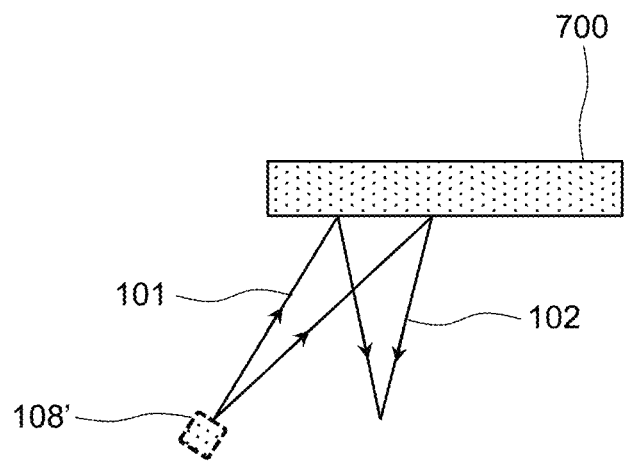
FIG. 7B is a schematic side view of playback of the recorded hologram of FIG. 7A.

An example process of writing the multiplexed volume hologram of the holographic combiner 660 is briefly illustrated in FIG. 7A. A slab of photosensitive material 700 is illuminated with a pair of beams: an object beam 702 and a converging reference beam 704. The object beam 702 may be placed at a position in the eye box, and the reference beam 704 may be placed at a position of a virtual source. The diverging object beam 702 can be formed e.g. by shining a laser beam through a microscope objective 706, and the converging reference beam 704 can be formed e.g. by focusing a collimated wide laser beam with a lens 708. Then, the slab of photosensitive material 700 is shifted by the step K, and the writing process is repeated, e.g. to cover multiple positions of the virtual sources and corresponding positions in the eyebox. The re-focusing of the diverging first beam 101 is in fact a playback of the hologram recorded by shining the first beam 101 emitted by the virtual projector 108' to obtain the second beam 102, as illustrated in FIG. 7B.

Figure 8:
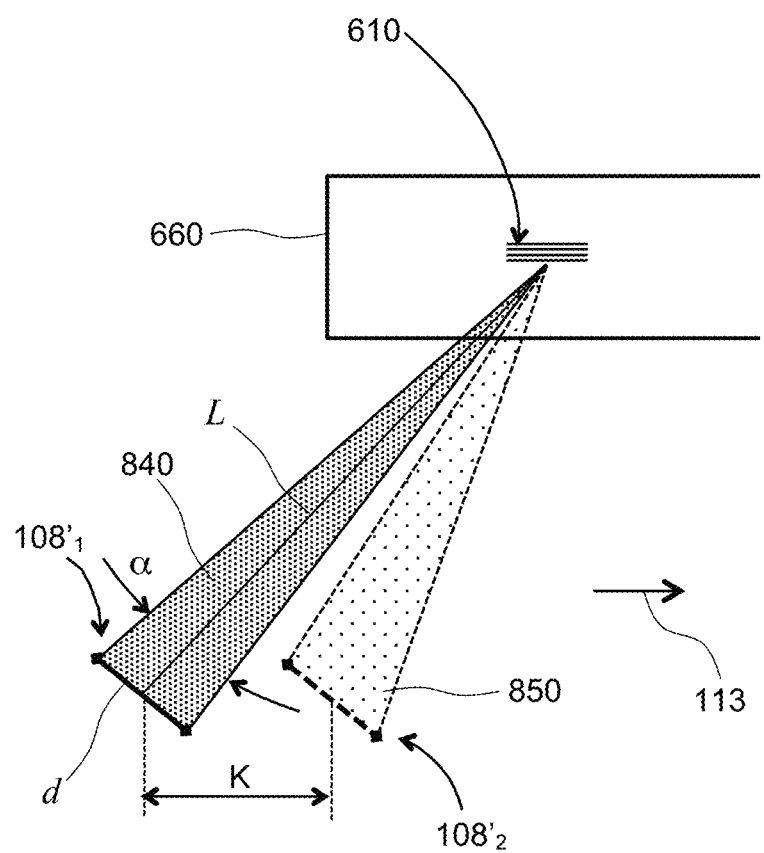
FIG. 8 is a schematic diagram illustrating a relationship between angular selectivity of the multiplexed volume hologram of FIGS. 6 and 7A, 7B and an exit pupil of an NED projector.

Since multiple holograms are written into the recording medium 700, a care must be taken to avoid, or at least reduce, crosstalk between different phase profiles. When a light source is imaged by an "incorrect" phase profile, a ghost image may be formed. To reduce the crosstalk effect, angular selectivities of the phase profiles need to be carefully controlled. Referring to FIG. 8, a hologram defined by the first profile 610 of phase should be able to accept and diffract a ray of light emitted from an exit pupil of the first virtual source 108'₁. The exit pupil of the first virtual source 108'₁ has a linear dimension d and is shown in FIG. 8 by a solid line with diamond ends. The corresponding acceptance angle is denoted as a. The acceptance angle α is a vertex angle of an acceptance cone 840. Any rays within the acceptance cone 840 must be accepted, i.e. refocused by the first profile 610, while any rays from the neighboring second virtual source 108'₂ within a rejection cone 850 must be rejected to avoid crosstalk. In other words, the hologram defined by the first profile 610 should be recorded such that the acceptance cone 840 does not overlap with the rejection cone 850. This condition will ensure that one does not have a spatial position on the holographic combiner 660 where two multiplexed holograms both have angular selectivity for a common ray direction. From this, one can determine the angular selectivity criterion of a hologram as $$\tan \alpha \leq d/L \quad (1)$$

where L is a distance between the first virtual source 108'₁ and the phase profile 610. The distance L can be approximated by an optical distance between the image source and the volume hologram, i.e. the holographic combiner 660. The criterion (1) above should hold for the first direction 113 for 1D beam replicators, or for each of the two directions for 2D beam replicators. When 1D replicators are used, image sources or projectors with an asymmetrical exit pupil may be used. For example, the exit pupil may remain small in a direction of the image beam replication, while in an orthogonal direction, where the image beams are not replicated, the exit pupil may be enlarged to provide a wide enough coverage in a corresponding dimension on the eyebox.

Referring back to FIGS. 1, 3, and 5, alternative embodiments of the combiner 160 may include, for example, a patterned metasurface comprising a stack of alternating metal and dielectric and/or metal/semiconductor layers. The projector 108 may include an image projector having an electronic display and beam collimating optics for converting the image displayed by the electronic display into a projected image in angular domain. Holographic projectors, e.g. those formed by a laser light source and a phase and/or amplitude spatial light modulator (SLM) may also be used. Holographic projectors have an advantage of having a variable focus and/or being able to at least partially compensate for optical aberrations of the combiner 160. It may be preferable to create a display with exit pupils less than the step size K of repeating the phase profile in the holographic combiner 160.

A method for displaying an image by an NED may include receiving a first beam of image light, e.g. the first beam 101 in FIGS. 1, 3, and 5. The first beam may be split into a plurality of second beams of image light, e.g. the second beams 102 in FIGS. 1, 3, and 5. The beam splitting may be performed e.g. by a waveguide image replicator 200A, 200B, 200C, 200D, 200E, or 200F of FIGS. 2A, 2B, 2C, 2D, 2E, and 2F, respectively. The beam splitting may also be performed e.g. by a mirror stack based image replicator 340 of FIGS. 3, 4A and 4B, 440 of FIG. 4C, or 540 of FIG. 5. Then, the plurality of second beams may be relayed to an eyebox of the NED such that the second beams at the eyebox are laterally offset in a first direction. The relaying may be done e.g. by using the combiner 160 of FIG. 1, the holographic combiner 660 of FIG. 6, and/or a combiner including a metasurface. As explained above, the first beam may be diverging and comprise an image in angular domain; the second beams split by the image replicator may be diverging, and the second beams relayed by the combiner at the eyebox may be converging, parallel to each other, and comprise the image in angular domain.

Figure 9A:
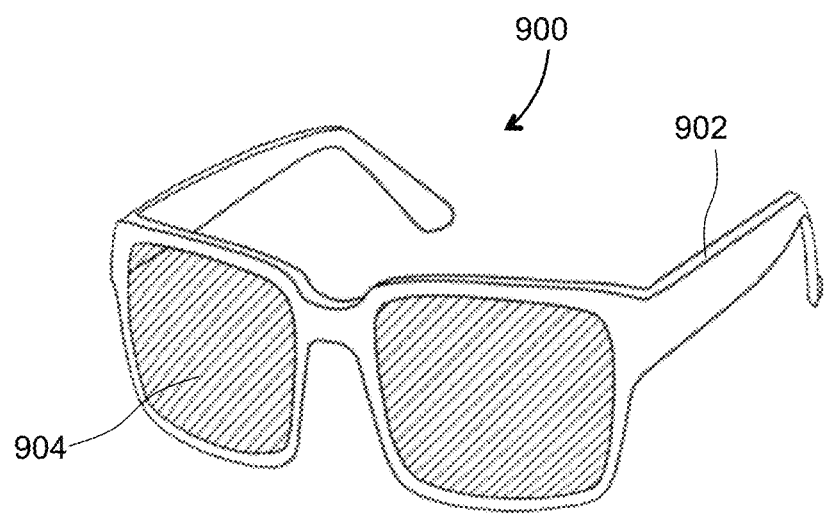
FIG. 9A is an isometric view of an eyeglasses form factor near-eye AR/VR display incorporating an image replicator and a combiner in accordance with the present disclosure.
Figure 9B:
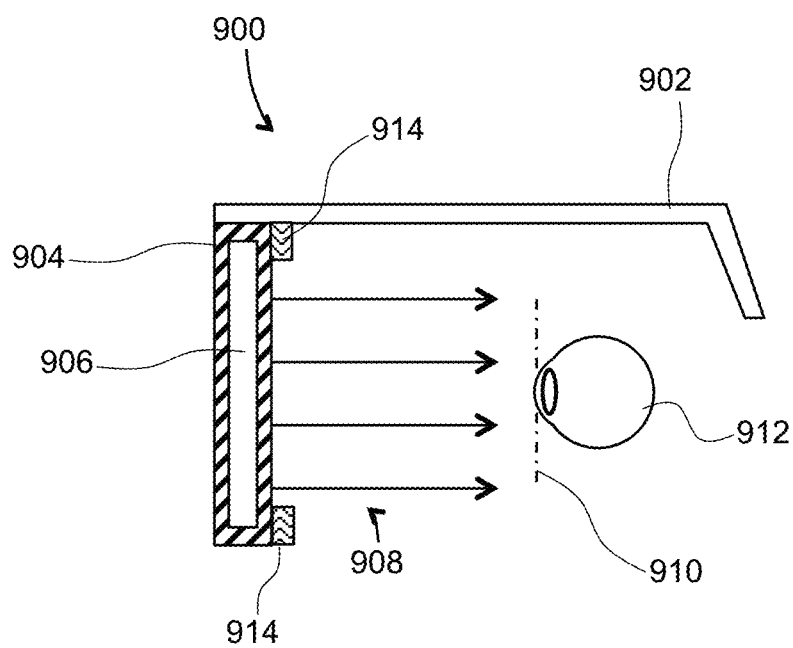
FIG. 9B is a side cross-sectional view of the display of FIG. 9A.

Referring to FIGS. 9A and 9B, a near-eye AR/VR display 900 includes body or frame 902 of the near-eye coherent AR/VR display 900 has a form factor of a pair of eyeglasses, as shown. A display 904 includes a display assembly 906 (FIG. 14B) provides image light 908 to an eyebox 910, i.e. a geometrical area where a good-quality image may be presented to a user's eye 912. The display assembly 906 may include any one of the NEDs 100, 300, and 500 of FIGS. 1, 3, and 5 respectively. A separate AR/VR display module may be provided for each eye, or one AR/VR display module for both eyes. For the latter case, an optical switching device may be coupled to a single electronic display for directing images to the left and right eyes of the user in a time-sequential manner, one frame for left eye and one frame for right eye. The images are presented fast enough, i.e. with a fast enough frame rate, that the individual eyes do not notice the flicker and perceive smooth, steady images of surrounding virtual or augmented scenery.

An electronic display of the display assembly 906 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, a scanned laser beam display, a liquid crystal on silicon (LCOS) display, a phase spatial light modulator (SLM) or a combination thereof. The near-eye coherent AR/VR display 900 may also include an eye-tracking system 914 for determining, in real time, the gaze direction and/or the vergence angle of the user's eyes 912. The determined gaze direction and vergence angle may be used for switching variable mirrors in a mirror stack of an image replicator, and may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. The near-eye coherent AR/VR display 900 may also include an audio system, such as small speakers or headphones.

Figure 10:
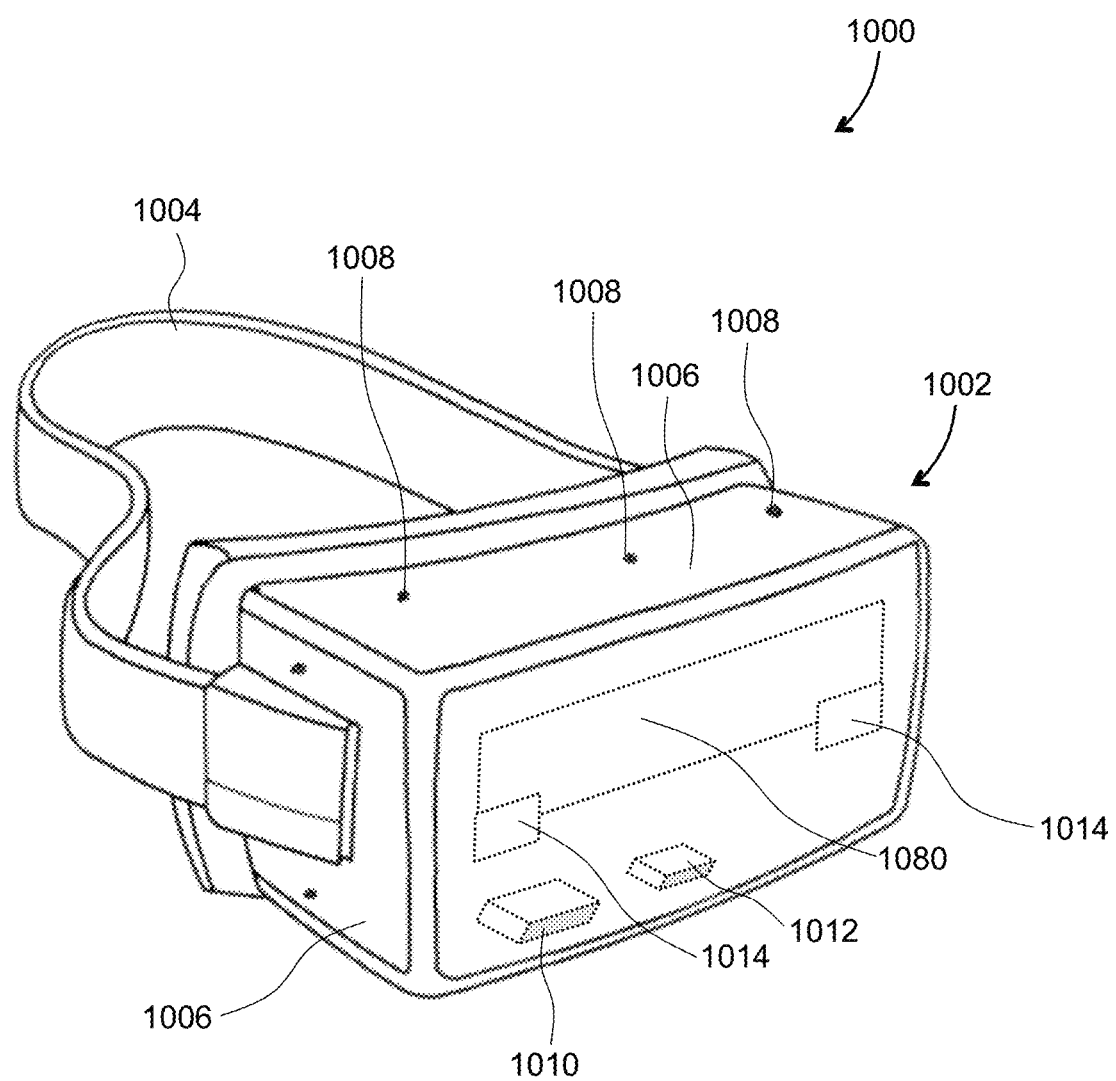
FIG. 10 is an isometric view of a head-mounted display (HMD) incorporating an image replicator and a combiner in accordance with the present disclosure.

Turning now to FIG. 10, an HMD 1000 is an example of an AR/VR near-eye wearable display system which encloses the user's face, for a greater degree of immersion into the AR/VR environment. The HMD 1000 can present content to a user as a part of an AR/VR system, which may further include a user position and orientation tracking system, an external camera, a gesture recognition system, control means for providing user input and controls to the system, and a central console for storing software programs and other data for interacting with the user for interacting with the AR/VR environment. The function of the HMD 1000 is to augment views of a physical, real-world environment with computer-generated imagery, and/or to generate the entirely virtual 3D imagery. The HMD 1000 may include a front body 1002 and a band 1004. The front body 1002 is configured for placement in front of eyes of a user in a reliable and comfortable manner, and the band 1004 may be stretched and/or adjusted to secure the front body 1002 on the user's head. A display system 1080 may include the NEDs 100, 300, and 500 of FIGS. 1, 3, and 5 respectively. The display system 1080 may be disposed in the front body 1002 for presenting AR/VR imagery to the user. Sides 1006 of the front body 1002 may be opaque or transparent.

In some embodiments, the front body 1002 includes locators 1008, an inertial measurement unit (IMU) 1010 for tracking acceleration of the HMD 1000, and position sensor(s) 1012 for tracking position of the HMD 1000. The locators 1008 are traced by an external imaging device of a virtual reality system, such that the virtual reality system can track the location and orientation of the entire HMD 1000. Information generated by the IMU and the position sensors 1012 may be compared with the position and orientation obtained by tracking the locators 1008, for improved tracking of position and orientation of the HMD 1000. Accurate position and orientation is important for presenting appropriate virtual scenery to the user as the latter moves and turns in 3D space.

The HMD 1000 may further include an eye tracking system 1014, which determines orientation and position of user's eyes in real time. The obtained position and orientation of the eyes allows the HMD 1000 to determine the gaze direction of the user and to adjust the image generated by the display system 1080 accordingly. In one embodiment, the vergence, that is, the convergence angle of the user's eyes gaze, is determined. The determined gaze direction and vergence angle may be used for switching variable mirrors in a mirror stack of an image replicator, and may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1002.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A near-eye display (NED) comprising:
an image replicator for directly receiving a diverging first beam of image light comprising an image in angular domain, wherein different angles of rays in the diverging first beam correspond to different coordinates of pixels of an image to be displayed, and for splitting the first beam into a plurality of diverging second beams of image light, wherein corresponding rays of the second beams are propagating parallel to each other; and
a combiner for receiving the plurality of second beams and relaying the plurality of second beams to an eyebox of the NED, wherein the combiner is configured to selectively redirect rays of the second beams depending on angle of incidence of the rays of the second beams on the combiner, such that rays of the second beams split from a corresponding ray of the first beam and redirected by the combiner are converging, wherein corresponding rays of the converging beams are parallel to each other and laterally offset in a first direction at the eyebox.

2. The NED of claim 1, wherein the combiner is angular- and wavelength-selective for relaying the plurality of second beams to the eyebox while transmitting external light to the eyebox substantially without modification.

3. The NED of claim 1, wherein the image replicator comprises a first waveguide comprising first and second surfaces, wherein the first surface is partially reflective at a wavelength of the image light to split off second beams of the plurality of second beams at reflections from the first surface as the first beam propagates in the first waveguide between the first and second surfaces in a zigzag pattern.

4. The NED of claim 3, wherein reflectivity of the first surface of the first waveguide is spatially variant.

5. The NED of claim 3, wherein the first waveguide contains a diffractive structure for at least one of: in-coupling the first beam into the first waveguide; or out-coupling second beams of the plurality of second beams from the waveguide.

6. The NED of claim 5, wherein the diffractive structure has a spatially varying diffraction efficiency for equating optical power of the second beams.

7. The NED of claim 3, wherein the first waveguide comprises an internally embedded quarter-wave waveplate, and wherein the first surface of the first waveguide comprises a polarization-selective reflector.

8. The NED of claim 3, wherein the first waveguide further comprises a side surface for receiving the first beam of image light, wherein the side surface is at a non-orthogonal angle to the first and second surfaces.

9. The NED of claim 3, wherein the first waveguide comprises a first optical element comprising the first surface, and a second, distinct optical element comprising the second surface, wherein in operation, the first beam propagates in an air gap between the first and second optical elements.

10. The NED of claim 3, wherein the image light comprises a plurality of color channels, wherein the first and second surfaces of the waveguide are at least partially transmissive at wavelengths of visible light different from wavelengths of the plurality of color channels.

11. The NED of claim 3, wherein the image replicator comprises a second waveguide comprising third and fourth surfaces at an angle to the first and second surfaces of the first waveguide, for receiving each second beam from the first waveguide and splitting each second beam into a plurality of third beams of image light; and wherein the combiner is configured for relaying each third beam at the eyebox of the NED such that the third beams at the eyebox are laterally offset in a second direction.

12. The NED of claim 1, wherein the image replicator comprises a first stack of reflectors in an optical path of the first beam, wherein each reflector of the first stack of reflectors is configured for splitting a second beam of the plurality of second beams from the first beam.

13. The NED of claim 12, wherein the image replicator further comprises a second stack of reflectors disposed at an angle to the first stack of reflectors for receiving each second beam from the first stack of reflectors and splitting each second beam into a plurality of third beams of image light;

wherein the combiner is configured for relaying each third beam at the eyebox of the NED such that the third beams at the eyebox are laterally offset in a second direction.

14. The NED of claim 12 wherein the first stack of reflectors comprises at least one variable reflector.

15. The NED of claim 14, further comprising:

an eye tracking system for determining at least one of position or orientation of a user's eye at the eyebox, and a controller operably coupled to the eye tracking system and the at least one variable reflector and configured to vary reflectivity of the at least one variable reflector depending on the at least one of position or orientation of the user's eye determined by the eye tracking system.

16. The NED of claim 1, wherein the combiner comprises an angularly multiplexed volume hologram comprising a succession of overlapping phase profiles for focusing the second beams at the eyebox, wherein the succession of overlapping phase profiles has a step corresponding to a lateral offset of the second beams at the eyebox, and wherein each phase profile is configured to selectively redirect rays of the second beams depending on angle of incidence of the rays of the second beams on the combiner.

17. The NED of claim 16, further comprising an image projector for providing the first beam comprising the image in angular domain wherein at least one of: the image projector has an exit pupil smaller than the step; or an acceptance angle of a first phase profile of the succession of overlapping phase profiles is no greater than an exit pupil size of the image projector divided by an optical distance between the volume hologram and the image projector.

18. The NED of claim 16, further comprising a holographic projector for providing the first beam of image light;

wherein at least one of: the holographic projector is configured to lessen optical aberrations of the combiner; or the holographic projector has a variable focus.

19. The NED of claim 1, wherein the combiner comprises a metasurface.

* * * * *